April 12, 1927.
H. E. BERGEN
1,624,385
APPARATUS FOR RECOVERING SOLIDS FROM PRESS LIQUIDS
Filed Nov. 2, 1925
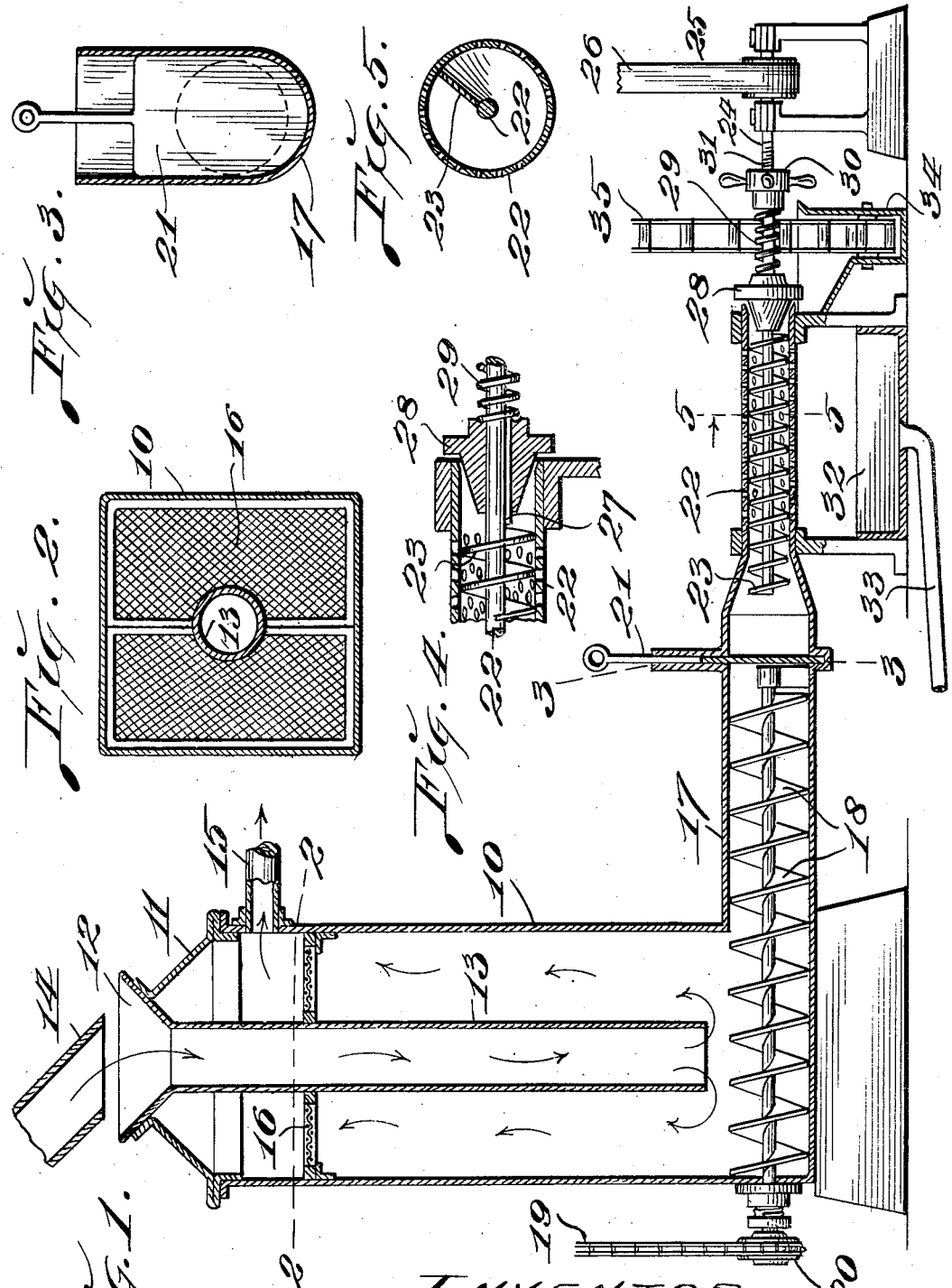
INVENTOR,
Harold E. Bergen.
By Martin P. Smith, Atty.

Patented Apr. 12, 1927.

1,624,385

UNITED STATES PATENT OFFICE.

HAROLD E. BERGEN, OF BERKELEY, CALIFORNIA.

APPARATUS FOR RECOVERING SOLIDS FROM PRESS LIQUIDS.

Application filed November 2, 1925. Serial No. 66,197.

My invention relates generally to the recovery of waste materials, and more particularly to an apparatus for recovering solids from press liquids, that is, liquids that discharge from presses, and which contain a relatively small percentage of solids, and which latter, when recovered, constitute a valuable and merchantable product.

My invention, as herein illustrated and described is especially designed for the treatment of the waste liquids that discharge from the presses used in fish canneries, but practically the same method and apparatus may be advantageously and economically employed in handling any liquid that may contain small percentages of animal or vegetable matter, and which will prove of economic value when recovered.

It will be understood that in fish canneries, it is the practice to subject the fish, after being properly cooked, to sufficient pressure to extract the greater proportion of liquids comprising principally, oil and water, and which are known as press liquids. These press liquids, according to the present practice are subjected to a flotation process in order to separate and recover the greater portion of the oils. However, after such flotation treatment, there still remains in the waste water, a certain percentage of oils, to which adhere a certain amount of solids, and it is the principal object of my invention, to provide relatively simple and economically operable means, whereby practically all of the solids that the carried in press liquids can be recovered and converted into useful products, such for instance, as poultry food or fertilizer.

With the foregoing and other objects in view, my invention consists in certain novel features of construction and arrangement of parts that will be hereinafter more fully described and claimed and illustrated in the accompanying drawings in which—

Fig. 1 is a vertical section taken lengthwise through the center of an apparatus embodying the principles of my invention.

Fig. 2 is a horizontal section taken on the line 2—2 of Fig. 1.

Fig. 3 is a cross section taken on the line 3—3 of Fig. 1.

Fig. 4 is an enlarged detail section of a spring held material discharge control valve.

Fig. 5 is an enlarged cross section taken on the line 5—5 of Fig. 1.

Referring by numerals to the accompanying drawings which illustrate a practical embodiment of my invention, 10 designates a vertically disposed tank having a removable cap or head 11, and supported by the latter is a hopper 12 from which depends a tubular member 13. This member 13 is axially disposed within tank 10 and its open lower end terminates a short distance above the bottom of said tank.

The spout 14 of the elevator that carries the press liquid, including oil and water from the press, discharges directly into hopper 12, and said press water after passing downwardly through tubular member 13 discharges from the lower end thereof into the lower portion of tank 10 and, as the volume of press water increases, it rises in said tank until it reaches and discharges through an outlet 15 at the top thereof.

Arranged on suitable supports in the upper portion of tank 10 just below outlet 15 is a screen 16 of fine mesh, preferably made in two or more parts to facilitate insertion and removal, and which screen functions as a strainer to prevent solids of appreciable size from passing off with the liquids that discharge through outlet 15.

Projecting outwardly from the lower portion of tank 10 is a horizontally disposed cylindrical member 17, and arranged to rotate in the bottom of said tank and said member 17, is a spiral conveyor 18 that may be driven in any suitable manner, preferably by a sprocket chain 19 operating on a sprocket wheel 20.

Arranged in the outer portion of tubular member 17 at the end of conveyor 18 is a suitable gate valve 21, and projecting from the end of member 17 beyond said gate valve is a tubular member 22, that is provided with relatively small perforations to form a screen or strainer.

Extending through this perforated tube or screen is a spiral conveyor 23, the shaft 24 of which projects a substantial distance beyond the outer end of the strainer and carried by the outer end of said shaft, is a belt wheel 25 that receives a belt 26.

Arranged to slide on a key or feather 27 that is seated in shaft 24 at the discharge end of screen 22 is a substantially conical plug 28 that normally closes the end of said screen and said plug is forced into said screen by a compression spring 29, the tension of which is regulated by a nut 30, that is mounted on a threaded portion 31 of shaft 24.

Arranged beneath screen 22 is a tank 32, and leading therefrom back to a suitable point of discharge is an oil and water duct 33.

The boot 34 of a suitably arranged elevator 35 is disposed below the discharge end of screen 22, said elevator being for the purpose of conveying the recovered solids to a suitable loading or packing platform.

In utilizing the apparatus shown and described, the solids that are carried into tank 10 with the press liquids gradually settle to the bottom of said tank, and after a sufficient amount of the material has thus accumulated, conveyor 18 is rotated so as to carry the solids to the end of the tubular member 17 having gate valve 21.

In due time, valve 21 is opened to permit the accumulated solids to pass into screen 22, within which operates conveyor 23. Spring 29 is "set" or tensioned by manipulation of nut 30 so that plug 28 can only open under a considerable degree of pressure, and as conveyor 23 continues to operate the recovered solids will be carried through screen 22 and compressed therein so as to squeeze out practically all liquids such as oil and water and the latter pass into tank 32 and discharge through outlet 33.

When the solids have been compressed to a predetermined degree against plug 28, the power of spring 29 will be overcome, with the result that plug 28 will move outwardly a short distance on its key, and consequently permit the compressed solids, practically devoid of press liquid to discharge from the end of the screen 22 into elevator boot 34.

The solids thus recovered, may be later dried or treated so as to serve the desired purposes and thus my improved method and apparatus are effective in converting material, which would otherwise be lost or wasted, into a valuable and useful commercial product.

Obviously, the construction of the apparatus as herein shown and described may be varied in minor details without departing from the spirit of the invention, the scope of which is set forth in the appended claims.

I claim as my invention:

1. The combination with a press liquid settling tank having uniform internal diameter throughout its length, of a tubular member extending outwardly from the lower portion of said tank, a conveyor arranged for operation within said tubular member and extending entirely across the bottom of the chamber within said settling tank, a gate at the outer end of said member, an independently operable conveyor leading from said gate and a screen surrounding said last-mentioned conveyor.

2. The combination with a press liquid settling tank having uniform internal diameter throughout its length, of a tubular member extending outwardly from the lower portion of said tank, a conveyor arranged for operation within said tubular member and extending entirely across the bottom of the chamber within said settling tank, a gate at the outer end of said member, an independently operable conveyor leading from said gate, a screen surrounding said last-mentioned conveyor and a spring-held valve arranged at the outer end of said screen.

3. The combination with a press liquid settling tank having uniform internal diameter throughout its length, of a tubular member extending outwardly from the lower portion of said tank, a conveyor arranged for operation within said tubular member and extending entirely across the bottom of the chamber within said settling tank, a gate at the outer end of said member, an independently operable conveyor leading from said gate, a screen surrounding said last-mentioned conveyor, a spring-held valve arranged at the outer end of said screen and means for regulating the tension of the spring that holds said valve.

4. The combination with a press liquid settling tank having uniform internal diameter throughout its length, of a tube leading outwardly from the lower portion of said tank, a spiral conveyor arranged for operation within said tube, a gate normally closing the outer end of said tube, a perforated housing leading outwardly from the outer end of said tube beyond said gate and a spiral conveyor arranged for operation within said perforated housing, the inner end of which last-mentioned spiral conveyor is spaced apart from the gate at the outer end of the first-mentioned tube.

5. The combination with a press liquid settling tank having uniform internal diameter throughout its length, of a tube leading outwardly from the lower portion of said tank, a spiral conveyor arranged for operation within said tube, a gate normally closing the outer end of said tube, a perforated housing leading outwardly from the outer end of said tube beyond said gate, a spiral conveyor arranged for operation within said perforated housing, the inner end of which last-mentioned spiral conveyor is spaced apart from the gate at the outer end of the first-mentioned tube and a spring-held valve arranged at the outer end of the perforated housing.

6. The combination with a press liquid settling tank having uniform internal diameter throughout its length, of a tubular member leading outwardly from the lower portion of said tank, the outer portion of said tubular member being smaller in diameter than the inner portion and said outer portion of smaller diameter being perforated, a gate located in said tubular member between the inner and outer portions thereof, a spiral conveyor arranged for operation within the inner larger portion of said tubular member, which spiral conveyor extends entirely across the lower end of the chamber within said settling tank and an independently operable spiral conveyor arranged for operation within the smaller perforated portion of said tubular member.

In testimony whereof I affix my signature.

HAROLD E. BERGEN.